United States Patent [19]
Adolf

[11] 3,895,018
[45] July 15, 1975

[54] PLASTER COMPOSITION

[76] Inventor: John Adolf, 2084 E. 34th Ave., Vancouver 16, British Columbia, Canada

[22] Filed: July 20, 1970

[21] Appl. No.: 56,739

[52] U.S. Cl.......... 260/29.7 S; 106/116; 260/29.6 S
[51] Int. Cl...................... C04b 13/24; C08f 45/24
[58] Field of Search......... 260/29.7 S, 29.6 S, 41 A; 106/116

[56] References Cited
UNITED STATES PATENTS

| | | | |
|---|---|---|---|
| 2,905,566 | 9/1959 | Schmidt et al................... | 260/29.7 S |
| 3,239,479 | 3/1966 | Roenicke et al................. | 260/29.7 S |
| 3,256,223 | 6/1966 | Heijmer........................... | 260/41 A |
| 3,487,038 | 12/1969 | Toy et al......................... | 260/29.7 S |
| 3,538,039 | 11/1970 | Peters et al..................... | 260/41 A |

*Primary Examiner*—Melvin Goldstein
*Assistant Examiner*—T. De Benedictis, Sr.
*Attorney, Agent, or Firm*—Carver & Company

[57] ABSTRACT

A plaster composition including sand a latex sealer and a filler ingredient. The filler ingredient can be e.g. slaked lime, gypsum board joint filler, hardwall plaster, choice of filler ingredient determining workability, drying characteristics, physical characteristics, and cost of the plaster composition. An adequate and easy to work composition can be made by including all three filler ingredients above in one mixture.

9 Claims, No Drawings

PLASTER COMPOSITION

BACKGROUND OF THE INVENTION

1. Field of the Invention

This invention relates to a plaster composition and is particularly related to a plaster composition having flexibility and an ability to adhere to surfaces to which common plasters cannot ordinarily be satisfactorily applied.

2. Prior Art

Conventional plastering compositions usually incorporate a mineral particulate material or aggregate, commonly sand, to which is added in an amount depending upon use to which the composition is to be put, a water settable gypsum product, e.g. plater of Paris and water to make a mixture having sufficient workability to permit application and spreading by a trowel. The settable gypsum product, which is hereinafter termed hardwall plaster, is a hardening agent.

Sometimes difficulties arise in applying common plaster composition to some surfaces particularly when applied in a thin coat which may spall check and crack. Furthermore conventional plaster compositions although being able to withstand high compressive stresses are brittle and lack tensile strength hence, if used as a covering coat for old plaster or for concrete walls, must be spread thickly e.g. one quarter to one half of an inch. Convention plaster compositions tend to crack and flake off when applied to flexible sheet panels such as plywood, and do not adher readily to painted or varnished surfaces.

Furthermore, conventional plaster compositions are not usually acceptable as surface finishes since, due to their porosity, they readily take and hold foreign matter. Consequently, they quickly become dirty and unsightly.

SUMMARY OF THE INVENTION

The present invention provides a flexible plaster composition which when applied to most prepared and painted surfaces, adheres readily. Such surfaces include rough and porous surfaces such as plaster, gypsum wallboard, concrete, finished plywood sheet, wallpaper, metal, and plastic. Plaster according to the invention, when spread to a thickness of from one sixteenth to one eighth of an inch does not readily crack, spall, or check.

The plaster composition of the present invention includes, as a minimum, a mixture of sand and latex sealer and a primary filler ingredient which can be hardwall plaster, or slaked lime, or a gypsum wall board joint filler. Filler ingredients affect drying time which is dependent on hydraulic setting characteristics of the filler ingredient when combined in the mix. Working properties of the plaster composition are improved by mixing all five ingredients above, in suitable proportions, with water, producing also a low cost composition. Secondary fillers of a particle size similar to the primary filler and having suitable drying characteristics may also be included.

DETAIL DESCRIPTION

In preparing a plaster composition according to the invention, ingredients in parts by volume, are used in proportions as follows:

EXAMPLE 1

| | | |
|---|---|---|
| hardwall plaster | 2 – 5 | parts |
| slaked lime | 1 – 2 | parts |
| gypsum wallboard joint filler | 1 – 2 | parts |
| latex sealer | 1 – 2 | parts |
| sand | 5 | parts |
| water | 3 – 4 | parts |

Many tradesmen in the art consider that such a mixture of hardwall plaster and lime to be so brittle as to be unsuitable for use as a plaster. A composition according to the invention includes these two ingredients and is flexible to such extent that it does not crack in applications where ordinary plaster often cracks badly.

A hardwall plaster is manufactured by Domtar Construction Materials Ltd. and sold under its registered trade mark PARISTONE, a slaked lime is manufactured by the Western Lime and Cement Co. of Milwaukee, U.S.A. as Hydrated Lime Type S complying with A.S.T.M. Specifications C206-49 and C207-49 Type S and Federal Specification SS-L-351 Type M (Masonry).

A gypsum wallboard joint filler manufactured by Domtar Construction Materials Ltd. is sold under its registered trade mark GYPROC as Gyproc Joint Filler General Purpose. An alternative gypsum wallboard joint filler is manufactured by the Synkoloid Co. of Canada Ltd. and sold under its trade mark SYNKO Topping Cement. Other well known makes of generally similar wallboard joint filler are available and in this specification, such fillers are termed joint fillers.

The hardwall plaster slaked lime and joint filler act as filler ingredients and affect drying characteristics of the mix. Other filler ingredients can be used as later explained.

A latex sealer is manufactured by the Brandrum Henderson Company and sold as Latex Emulsion Sealer 3660. This is a polyvinyl acetate co-polymer internally plasticized latex resin emulsion, pigmented with titanium dioxide and extenders. A further latex sealer is manufactured by International Paints (Canada) Limited and sold under its registered trade mark INTERLUX as Latex Sealer White.

Specific ingredients above give satisfactory results when used in a composition according to Example I.

Latex sealers generally have vehicles based on compounds such as polyvinyl acetate, vinyl acrylic, or styrene butadiene, ingredients being added to these vehicles to reduce foaming and increase drying time. Titanium dioxide is commonly used as a pigment. Latex sealers are a stabilized suspension of a polymer in water and are commonly used as a primer-sealer for application on common porous wall surfaces.

An aggregate is used to give body to the composition and to provide a pleasing surface. For optimum results sand used as in aggregate in Example I, is washed sand having a particle size in a range between one sixteenth to one eighth of an inch. Sand having a maximum grain size of about one eighth of an inch hereinafter is coarse sand, a suitable sand being exemplified by sieve analysis in Table I.

TABLE 1

SIEVE ANALYSIS

| weights | sieve no. | size of opening inches | mm. | weight retained | total wt. finer than | percent finer than | percent finer than (original sample) |
|---|---|---|---|---|---|---|---|
| original sample 300.0 gms | coarse sieves | 3 1½ | | | | | |
| retained No. 4 | | ¾ | 19.10 | | | | |
| | | ⅜ | 9.52 | | | | |
| total passing No. 4 | 4 | | 4.76 | | | | |
| split portion passing No. 4 | | | | | 299.9 | | 100.0 |
| | fine sieves | | | | | | |
| | 10 | | 2.000 | 0.7 | 299.2 | | 99.8 |
| portion washed on No. 200 | 20 | | .840 | 264.8 | 34.4 | | 11.5 |
| dry before wash | 40 | | .420 | 32.3 | 2.1 | | 0.7 |
| dry after wash | 60 | | .250 | 0.9 | 1.2 | | 0.4 |
| passing No. 200 | 100 | | .149 | 0.3 | 0.6 | | .3 |
| | 200 | | .074 | 0.3 | 0.6 | | .2 |
| | | | pan + washed | 0.6 | | | | sieving time: 15 minutes    sample classification: SAND - white, med., uniform, angular, clean.

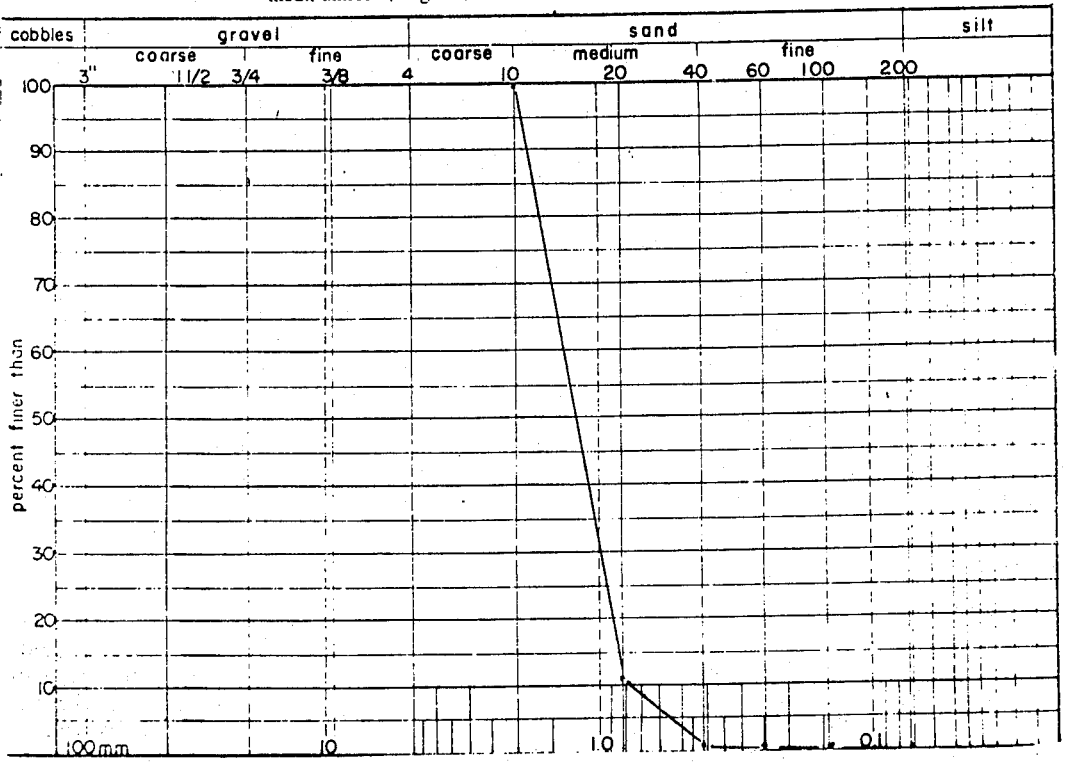

Sands similar to that shown in Table I can be used. Aggregates other than sand can be used, a substitute being granite chips having a particle size similar to the washed sand. Aggregates should be free of acid and salts from seawater, and for best results are washed.

The sand and the hardwall paster give the composition body and hardness when dry, and the slaked lime inhibits drying and whitens the dried plaster. Increased flexibility of the composition, and resistance to spalling, cracking, and checking, is attributed to the latex sealer. The joint filler also increases setting time of the lime and hardwall, permitting workmen to apply and work the composition in a proper manner. Proportions of the filler ingredients can be varied as indicated, and the quantity of water can also be varied. The variations are for purposes of producing a paste-like mix, having a consistency which enables a workman to work the composition smoothly with a trowel, over a surface to be covered.

Factors affecting workability are complex, a skilled workman knows by feel on the trowel whether or not the consistency is what he requires.

Use of a plastic primer is recommended, a suitable primer being manufactured by International Paints (Canada) Limited and sold as Plastic-Primer. An alternative primer is manufactured by Tonecraft Paints Ltd. and sold as Plastic Primer 2712 White. Other primers are available, being sold as primers for application over glossy painted or varnished surfaces and hereinafter are termed plastic primer.

A common rule of thumb in the plastering trade is that if you can drink the water, you can use it to mix plaster. Satisfactory results are obtained using water from a regular drinking water supply.

PREPARATION OF THE COMPOSITION

In preparing the composition, the sand the slaked lime and the joint filler are mixed together in the proportions above producing a dry mix; then the water is added to the dry mix in a usual manner producing a wet mix. After agitation and mixing, the latex sealer is poured into the wet mix and the mix is stirred. The hardwall plaster is then stirred into the wet mix slowly so as to prevent setting. The mixture is permitted to stand for a short time, about 15 minutes, and then applied.

PREPARATION OF SURFACES TO BE PLASTERED

As in conventional surface preparation for primers the surfaces to be plastered are prepared by removing grease, oil, flaking, or excessive cracking of existing finishes.

A primer suitable for each surface to be plastered is selected. Plastic primer as before described is used to provide a base for plastering on surfaces such as e.g.; painted or varnished wood, glass and ceramics, plastics, acoustic ceiling tile. For surfaces with a high gloss two coats of primer are recommended to provide an adequate base. Plastic primer can also be used on wallboard and plaster surfaces, provided these surfaces are dry and are not subject to dampness, seepage etc.

Metal surfaces are prepared in a usual manner and are initially primed with metal primer for that particular metal and, when dry, are painted with plastic primer as a base for the plaster composition. As a substitute for plastic primer, the initially primed metal can be painted with a common alkyd-base wood primer or common oil-base wood primer.

For concrete surfaces, and also wallboard and plaster especially if the wallboard and plaster surfaces have a tendency to be damp, the surface is primed with a latex sealer as previously described.

The sealers and primers above reduce loss of water from the mix by absorption into the surface covered, and increase drying time and/or provide a suitable base for the plaster.

To reduce chances of excessive cracking of the plaster composition, existing cracks in plaster or wallboard are taped with common drywall tape glued to surfaces surrounding the crack. Suitable glue above is a contact adhesive, WELDBOND, (trade mark of Frank T. Ross and Sons Ltd.) or alternatively POLLYFILLA (registered trade mark of Niagara Company Ltd.) can be used. Other suitable adhesives are known.

APPLICATION OF THE COMPOSITION

The plaster composition is applied with a trowed in the same manner as common plasters are applied. It is applied as a paste-like mixture to a prepared and primed surface as above, and troweled until the sand permits the trowel to slide easily over the plaster composition. Thickness of the applied composition is thus automatically determined as it corresponds to the maximum grain size of the sand. Furthermore, particles of sand lend the composition when applied and set a finish which usually does not require painting. The plaster also has, compared with common plaster, improved resistance to cracking under action of heat from accidental fires.

Compositions and characteristics of ingredients of different manufacturers sold as similar products vary and, because of this variation, for optimum results portions listed are sometimes adjusted. Also, as is known, characteristics of ingredients sold as the same ingredients from the same manufacturer vary from time to time depending on storage of the ingredient and original raw material source. Variations in composition and/or material sources may result in variations of colour in dried plaster. If this is unsightly, a coat of common latex paint over the plaster is usually sufficient to mask colour variations.

Also, as is known in the trade, humidity, ambient temperature and temperature of surface to be plastered, affect drying characteristics. For best results proportions of the ingredients should be adjusted to suit these conditions. Application of plaster to exposed outside surfaces requires suitable weather to attain satisfactory results.

For application of plaster to surfaces having a small area, say less than about four hundred square feet, certain ingredients can be eliminated from the composition of Example 1 providing alternative compositions which tend to be more expensive and to dry relatively quickly. Hence such alternatives are generally used for simple and small area plastering application. Alternative compositions can be used when supplies of some ingredients become exhausted. As before, sufficient water is added, in approximate proportions as given, to produce a workable paste-like mix. Variations in final colour are more likely to occur with these compositions than with the composition described in Example 1.

Example 2

A first alternative simplified composition, Example 2, in which joint filler is used as a filler ingredient, has ingredients in parts by volume in ranges as follows:

| | |
|---|---|
| sand | 4 – 5 parts |
| latex sealer | 3 – 5 parts |
| joint filler | 4 – 5 parts |
| water | 0 – 2 parts |

Example 3

A second alternative simplified composition Example 3, in which slaked lime is used as a filler ingredient, has ingredients in parts by volume in ranges as follows:

| | |
|---|---|
| sand | 4 – 5 parts |
| latex sealer | 4 – 5 parts |
| slaked lime | 1 – 2 parts |
| water | 1 – 2 parts |

Example 4

A third alternative simplified composition Example 4, in which hardwall plaster is used as a filler ingredient, has ingredients in parts by volume in ranges as follows:

| | |
|---|---|
| sand | 4 – 5 parts |
| latex sealer | 3 – 5 parts |
| hardwall plaster | 2 – 4 parts |

Example 4 does not use water and is expensive. As seen sand and latex sealer are common to all compositions above and a further filler ingredient, either joint filler, slaked lime, or hardwall plaster, is added, the three filler ingredients above being referred to as primary filler ingredients.

Other filler ingredients, termed secondary filler ingredients, can also be used in compositions which include at least one primary filler ingredient. The secondary filler ingredients include one or more ingredients from a group including chalk dust, titanium dioxide powder, asbestos dust, some mineral dusts, and hydraulic setting properties of the filler affects drying qualities of the plaster composition, as well as final properties. There is a wide variation of proportions of the secondary filler ingredients that can be used, but generally the total volume of secondary filler ingredient does not exceed the volume of slaked lime used in a composition containing slaked lime.

Specific Examples, 5 through 14, within the above ranges as exemplified by Examples 2 through 4 are tabulated in Table II. The examples include combinations of two filler ingredients and generally have physical properties, when dry, similar to Example 1.

However, application of compositions according to an example of the group containing Example 5 through 14 is limited to relatively small areas as drying time of the composition is reduced from that of Example 1. Compositions without slaked lime generally dry a light grey colour and, if a white finish is to be achieved, require painting white.

Compositions including hardwall plaster sometimes do not require water, liquid content being available from the latex sealer. These compositions are relatively expensive because of relatively large latex sealer content.

TABLE II

Tabulation of compositions in which filler ingredients are Joint Filler Slaked Lime and Hardwall Plaster in parts by volume (sand is used in 4–5 parts by volume in each composition below)

| Example number | Latex sealer | Joint filler | Slaked lime | Hardwall plaster | Water |
|---|---|---|---|---|---|
| 5 | 4–5 | 3–4 | 4–5 | — | 1–2 |
| 6 | 4–5 | 3–4 | 4–5 | 1–2 | 1–2 |
| 7 | 4–5 | 4–5 | 4–5 | — | — |
| 8 | 4–5 | 4–5 | 4–5 | 1–2 | — |
| 9 | 4–5 | 3–4 | 2–3 | 2–3 | 3–4 |
| 10 | 4–5 | 3–5 | — | 2–4 | — |
| 11 | 4–5 | 3–4 | — | 2–4 | 1–2 |
| 12 | 4–5 | 4–5 | 1–2 | 2–3 | 1–2 (1) |
| 13 | 4–5 | 4–5 | 1–2 | 1–2 | —(1) |
| 14 | 4–5 | 4–5 | — | 1–2 | —(2) |

(1) Not recommended – cracks too easily
(2) Very good – but expensive.

I claim:
1. A flexible plaster composition consisting essentially of:
   a. 1–9 parts by volume of a primary filler selected from the group consisting of slaked lime, hardwall plaster, and gypsum wallboard joint filler,
   b. 1–5 parts by volume of a latex sealer, said latex sealer being a stabilized aqueous emulsion of a compound selected from the group consisting of vinyl acetate, vinyl acrylic, and styrene-butadiene resins,
   c. 4–5 parts by volume of sand having a particle size distribution such that a major portion thereof has a particle size range between one-sixteenth and one-eighth of an inch, and
   d. water in sufficient amount to attain a workable consistency.

2. A composition as defined in claim 1, wherein
   i. the primary filler ingredient includes, 2 – 5 parts by volume of hardwall plaster, 1 – 2 parts by volume slaked lime, and 1 – 2 parts by volume gypsum wallboard joint filler,
   ii. the latex sealer is 1 – 2 parts by volume
   iii. the sand is 5 parts by volume.

3. A composition as defined in claim 1, characterized by relatively quick drying, wherein
   i. the primary filler ingredient is essentially only gypsum wallboard joint filler and is 4 – 5 parts by volume,
   ii. the latex sealer is 3 – 5 parts by volume.

4. A composition as defined in claim 1, characterized by relatively quick drying, wherein
   i. the primary filler ingredient is essentially only slaked lime, 1 – 2 parts by volume,
   ii. the sealer is 4 – 5 parts by volume.

5. A composition as defined in claim 1 wherein ingedients are as follows,
   i. the primary filler ingredient is essentially only hardwall plaster, 2 – 4 parts by volume,
   ii. the latex sealer is 3 – 5 parts by volume,
   iii. the amount of water required to attain the desired working consistency being contained in at least one ingredient.

6. A composition as defined in claim 1 wherein:
   i. the primary filler ingredient includes only hardwall plaster and gypsum wallboard joint filler in a proportion of 1 – 4 parts by volume,
   and the composition further includes:
   ii. 1 – 5 parts by volume of a secondary filler ingredient, the secondary filler ingredient being essentially composed of at least one of the following ingredients: chalk dust, titanium dioxide powder, asbestos dust.

7. A composition as defined in claim 1 wherein:
   i. the primary filler ingredient includes only hardwall plaster in a proportion of 1 – 4 parts by volume,
   and the composition further includes:
   ii. 1 – 5 parts by volume of a secondary filler ingredient, the secondary filler ingredient being essentially composed of at least one of the following ingredients: chalk dust, titanium dioxide powder, asbestos dust.

8. A composition as defined in claim 1, wherein:
   i. the primary filler ingredient includes 4 parts by volume of hardwall plaster, 1½ parts by volume slaked lime, and 1½ parts by volume gypsum wallboard joint filler,
   ii. the latex sealer is 1½ parts by volume,
   iii. the sand is 5 parts by volume,
   iv. the water is 3 parts by volume.

9. A compound as claimed in claim 1 wherein:
   i. the primary filler ingredient is 4 – 9 parts by volume,
   ii. the latex sealer is 1 – 2 parts by volume,
   iii. the sand is 5 parts by volume.

* * * * *